(12) United States Patent
Batra et al.

(10) Patent No.: US 12,244,142 B2
(45) Date of Patent: Mar. 4, 2025

(54) MONITORING AN ELECTRICAL-ENERGY TRANSMISSION SYSTEM

(71) Applicant: Siemens Energy Global GmbH & Co. KG, Munich (DE)

(72) Inventors: Arvind Batra, Nuremberg (DE); Puneet Harminder Singh, Fürth (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/918,263

(22) PCT Filed: Apr. 1, 2021

(86) PCT No.: PCT/EP2021/058712
§ 371 (c)(1),
(2) Date: Oct. 11, 2022

(87) PCT Pub. No.: WO2021/204698
PCT Pub. Date: Oct. 14, 2021

(65) Prior Publication Data
US 2023/0126493 A1   Apr. 27, 2023

(30) Foreign Application Priority Data
Apr. 9, 2020   (DE) ............ 10 2020 204 619.0

(51) Int. Cl.
*H02J 13/00*     (2006.01)
*G06F 3/0482*    (2013.01)
*G06F 3/04847*   (2022.01)

(52) U.S. Cl.
CPC ...... *H02J 13/00002* (2020.01); *G06F 3/0482* (2013.01); *G06F 3/04847* (2013.01); *H02J 13/00001* (2020.01); *H02J 13/00028* (2020.01)

(58) Field of Classification Search
CPC ............ G06F 3/0482; G06F 3/04847; H02J 13/00002; H02J 13/00028; H02J 13/00001
See application file for complete search history.

(56) References Cited

U.S. PATENT DOCUMENTS 5,754,939 A * 5/1998 Herz ............... H04N 21/4622
                                              348/E7.071
8,417,391 B1 * 4/2013 Rombouts ............ G05B 13/02
                                              700/297

(Continued)

FOREIGN PATENT DOCUMENTS

CA     2848637 A1 * 12/2012 ........... G06F 16/335
CA     3054365 A1 *  8/2018 ......... G06F 16/1794

(Continued)

OTHER PUBLICATIONS

Tableau, "Best Practices for Effective Dashboards", published on Nov. 1, 2018 to https://help.tableau.com/current/pro/desktop/en-us/dashboards_best_practices.htm, retrieved Jul. 10, 2023. (Year: 2018).*

(Continued)

*Primary Examiner* — Shourjo Dasgupta
(74) *Attorney, Agent, or Firm* — Laurence A. Greenberg; Werner H. Stemer; Ralph E. Locher

(57) ABSTRACT

A method for monitoring an electrical-energy transmission system having a plurality of system components. Each of the system components includes a sensor unit, which captures measurement data regarding at least one operating parameter of the system component, and a communication interface, which transmits the measurement data and component information regarding the system component. The measurement data and component information regarding a system component are transferred into a data cloud by way of the communication interface of the system component. A graphical user interface is configured to visualize informa- (Continued)

tion regarding the electrical-energy transmission system. The information is generated from the measurement data and component information transferred into the data cloud. A user profile defining the information displayed to the user is created for a user of the graphical user interface.

11 Claims, 2 Drawing Sheets

(56) References Cited

U.S. PATENT DOCUMENTS

| | | | | |
|---|---|---|---|---|
| 9,880,710 | B1* | 1/2018 | Mackinlay | G06F 3/0484 |
| 10,783,214 | B1* | 9/2020 | Rowe | G06F 16/904 |
| 2002/0052721 | A1* | 5/2002 | Ruff | G06F 9/451 |
| | | | | 703/1 |
| 2006/0031114 | A1* | 2/2006 | Zommers | G06Q 10/06314 |
| | | | | 705/7.33 |
| 2006/0218533 | A1* | 9/2006 | Koduru | G06F 11/3447 |
| | | | | 717/124 |
| 2007/0100787 | A1* | 5/2007 | Lim | H04N 21/41407 |
| 2007/0260375 | A1* | 11/2007 | Hilton | G01M 17/007 |
| | | | | 701/33.4 |
| 2007/0283046 | A1* | 12/2007 | Dietrich | G06F 16/13 |
| | | | | 709/245 |
| 2008/0262902 | A1* | 10/2008 | Bullis | G06Q 30/0201 |
| | | | | 705/7.29 |
| 2008/0282194 | A1* | 11/2008 | Chiang | G06F 3/0482 |
| | | | | 715/835 |
| 2009/0076749 | A1 | 3/2009 | Nasle | |
| 2009/0307741 | A1* | 12/2009 | Casagrande | H04N 21/23424 |
| | | | | 725/137 |
| 2011/0145753 | A1* | 6/2011 | Prakash | G06F 3/04812 |
| | | | | 715/783 |
| 2012/0095863 | A1* | 4/2012 | Schiff | G06Q 30/0282 |
| | | | | 705/26.7 |
| 2012/0290225 | A1* | 11/2012 | Julian | F01K 13/02 |
| | | | | 702/34 |
| 2014/0143718 | A1* | 5/2014 | Kumakawa | G06F 3/0481 |
| | | | | 715/800 |
| 2014/0195977 | A1 | 7/2014 | Chang et al. | |
| 2014/0279707 | A1* | 9/2014 | Joshua | G06Q 30/0283 |
| | | | | 701/1 |
| 2015/0213211 | A1* | 7/2015 | Zaleski | G06F 3/0482 |
| | | | | 715/753 |
| 2016/0314426 | A1 | 10/2016 | Pyykköet al. | |
| 2017/0012998 | A1* | 1/2017 | Thornbury | G06Q 50/18 |
| 2017/0329498 | A1* | 11/2017 | Schikora | G06F 3/04842 |
| 2018/0081344 | A1* | 3/2018 | Romatier | G05B 23/0218 |
| 2018/0313953 | A1* | 11/2018 | Gatland | G01S 15/10 |
| 2019/0342185 | A1* | 11/2019 | Barmentloo | G06F 3/0482 |
| 2020/0059413 | A1 | 2/2020 | Ricci | |
| 2020/0076955 | A1 | 3/2020 | DeSalle et al. | |
| 2020/0133257 | A1* | 4/2020 | Cella | G05B 19/4183 |
| 2020/0172112 | A1* | 6/2020 | Kawashima | G06Q 30/0278 |

FOREIGN PATENT DOCUMENTS

| | | | | |
|---|---|---|---|---|
| CA | 2878449 | C * | 2/2019 | G06Q 10/063114 |
| CA | 2975441 | C * | 12/2020 | G06F 21/6218 |
| CN | 100593168 | C * | 3/2010 | G06F 16/9535 |
| CN | 207128633 | U * | 3/2018 | |
| CN | 109143992 | A * | 1/2019 | G05B 19/045 |
| EP | 3136076 | A1 | 3/2017 | |
| JP | 2004038949 | A * | 2/2004 | G06F 16/9577 |
| JP | 2014531666 | A * | 11/2014 | |
| WO | WO-2010129913 | A1 * | 11/2010 | G05B 15/02 |
| WO | WO 2013074866 | A1 | 5/2013 | |

OTHER PUBLICATIONS

Google Cloud, "Select metrics when using Metrics Explorer", published Jan. 8, 2018 to https://cloud.google.com/monitoring/charts/metrics-selector, retrieved Jan. 4, 2024. (Year: 2018).*
Tableau, "Filter Data from Your Views", published Jun. 12, 2009 to https://help.tableau.com/current/pro/desktop/en-us/filtering.htm, retrieved Jan. 4, 2024. (Year: 2009).*
Sisense, "Data Discovery", published on Jan. 6, 2020 to https://dtdocs.sisense.com/article/data-discovery, retrieved Jan. 4, 2024. (Year: 2020).*
Pranabesh Mandal, "Data visualization in AWS using AWS Data Exchange and Amazon QuickSight", published on Jan. 10, 2020 to https://aws.amazon.com/blogs/awsmarketplace/data-visualization-in-aws-using-aws-data-exchange-and-amazon-quicksight, retrieved Jan. 4, 2024. (Year: 2020).*
Mohamed Mouine, etc., "How to model a customized visualization", published via 2013 17th International Conference on Information Visualisation, pp. 118-122, 2013, retrieved Oct. 22, 2024. (Year: 2013).*

* cited by examiner

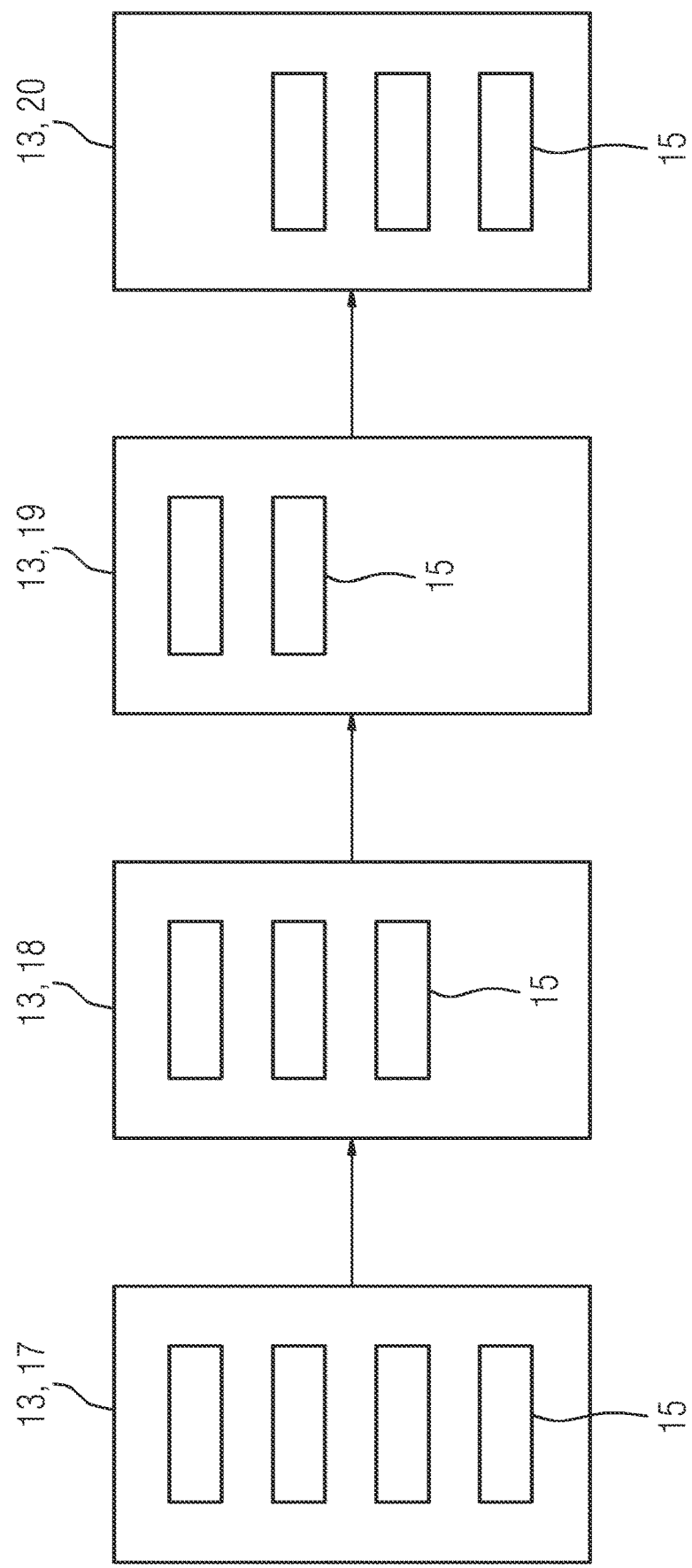

MONITORING AN ELECTRICAL-ENERGY TRANSMISSION SYSTEM

FIELD AND BACKGROUND OF THE INVENTION

The invention relates to a method for monitoring an electrical energy transmission system.

Electrical energy transmission systems are monitored in order to achieve a reliable, safe and efficient energy supply, to increase productivity, to reduce unscheduled downtimes and to improve performance. An electrical energy transmission system is understood here for example to mean a localized system such as switchgear or a spatially expansive system such as an electrical energy transmission grid. An electrical energy transmission system has a multiplicity of system components such as for example transformers, feedthroughs, measuring transducers, coils, power switches, surge arresters and circuit breakers. Such system components are nowadays already provided with sensors and a digital communication interface by way of which operating data of these system components are acquired and communicated in order to monitor the electrical energy transmission system for the purposes of optimized operation and reduction of faults and failures. For this purpose, the acquired data are evaluated and processed by application software in order to display operating states of the electrical energy transmission system and its system components to a user of the application software and for example possibly to indicate critical operating states, faults or failures. Due to the large number of different system components, it is however often unclear and difficult for a user to filter out the information relevant to him from the large amount of information available.

SUMMARY OF THE INVENTION

The invention is based on the object of specifying an improved method for monitoring an electrical energy transmission system.

The object is achieved according to the invention by a method having the features as claimed and a computer program having the features as claimed.

Advantageous embodiments of the invention are the subject of the dependent claims.

The method according to the invention is used to monitor an electrical energy transmission system having multiple system components that each have a sensor unit that is configured to acquire measured data regarding at least one operating parameter of the system component and a communication interface that is configured to transmit the measured data and component information regarding the system component. The measured data and component information regarding a system component are transmitted to a data cloud via the communication interface of the system component and provision is made for a graphical user interface that is configured to visualize information about the electrical energy transmission system that is generated from the measured data and component information transmitted to the data cloud. A user profile is created for a user of the graphical user interface and defines the information that is displayed to the user.

The method according to the invention makes it possible to visualize information about the electrical energy transmission system in order to monitor it. What is known as a digital twin of the electrical energy transmission system may in particular be visualized. The transmission of the measured data and component information to a data cloud (cloud) in this case advantageously makes these data available to different users independently of their location. Creating a user profile that defines the information that is displayed to a user in this case makes it possible to display information to the user that is associated with his user profile. In other words, this allows user-dependent filtering of the displayed information. This makes it easier for a user to operate the graphical user interface and at the same time allows a selection and display of information relevant to the user that is adapted to the user and his interests.

In one embodiment of the invention, the user profile of the user is stored and, when the graphical user interface is called by the user, the information defined by the user's user profile is displayed to the user. A selection of information defined by the user's user profile is thereby advantageously displayed to the user when the graphical user interface is called, without the user having to create a user profile each time the graphical user interface is called.

In a further embodiment of the invention, the graphical user interface has checkboxes for the selection of information and the user profile of a user is created on the basis of checkboxes marked by the user. The user profile of a user may thereby be created easily from the checkboxes marked by the user. A user is furthermore given the ability to define his user profile by simply marking checkboxes.

In a further embodiment of the invention, the user profile is able to be changed by the user, for example by the user changing the marked checkboxes. The user profile may thereby easily be adapted to changing interests of the user.

In a further embodiment of the invention, the graphical user interface has a plurality of filter levels that build logically on one another and are interlinked and have checkboxes, such that marking of a combination of checkboxes of a filter level determines the checkboxes, displayed by the graphical user interface, of a filter level that follows this filter level. This advantageously allows a staggered definition of the user profile over multiple filter levels and makes it even easier to create the user profile for a user through a clear structure of the checkboxes.

By way of example, the checkboxes of a first filter level may be used to select a respective group of system components. At least one such group may for example comprise system components having an identical function. As an alternative or in addition, at least one group may for example comprise system components that are arranged at a location of the electrical energy transmission system that is assigned to these system components or in a spatial region of the electrical energy transmission system that is assigned to these system components. A user is thereby able to select groups of system components that are relevant to him in the first filter level, for example in terms of a function of system components or a spatial arrangement of system components.

In a further embodiment of the invention, the checkboxes of a second filter level may be used to select subgroups of groups of system components that are able to be selected using the checkboxes of the first filter level. This advantageously makes it possible to fine-tune the selection of system components selected via one or more groups of the first filter level by selecting one or more subgroups of these groups in the second filter level.

In a further embodiment of the invention, the checkboxes of a third filter level may be used to select individual system components. This allows a specific selection of particular system components.

In a further embodiment of the invention, the checkboxes of a fourth filter level may be used to select information regarding system components that is displayed by the graphical user interface. Such information is for example a temperature of a system component, a pressure in a system component, a current strength of an electric current flowing in a system component, a voltage present at or in a system component and/or a switching state of a system component or of a switching unit of a system component.

In a further embodiment of the invention, the graphical user interface is provided by application software (what is known as an app) for terminals such as cell phones (for example smartphones) or computers, in particular portable computers (for example tablets, notebooks, laptops). The graphical user interface may thereby advantageously be implemented and displayed on different terminals, in particular mobile terminals, independently of their location.

A computer program according to the invention comprises commands that, when the computer program is executed on a terminal, prompt said terminal to execute the graphical user interface of a method as claimed in one of the preceding aspects of the description.

The above-described properties, features and advantages of this invention and the way in which these are achieved will become clearer and more clearly comprehensible in connection with the following description of exemplary embodiments, which are explained in more detail in connection with the drawings, in which:

DETAILED DESCRIPTION OF THE INVENTION

Figure 1:
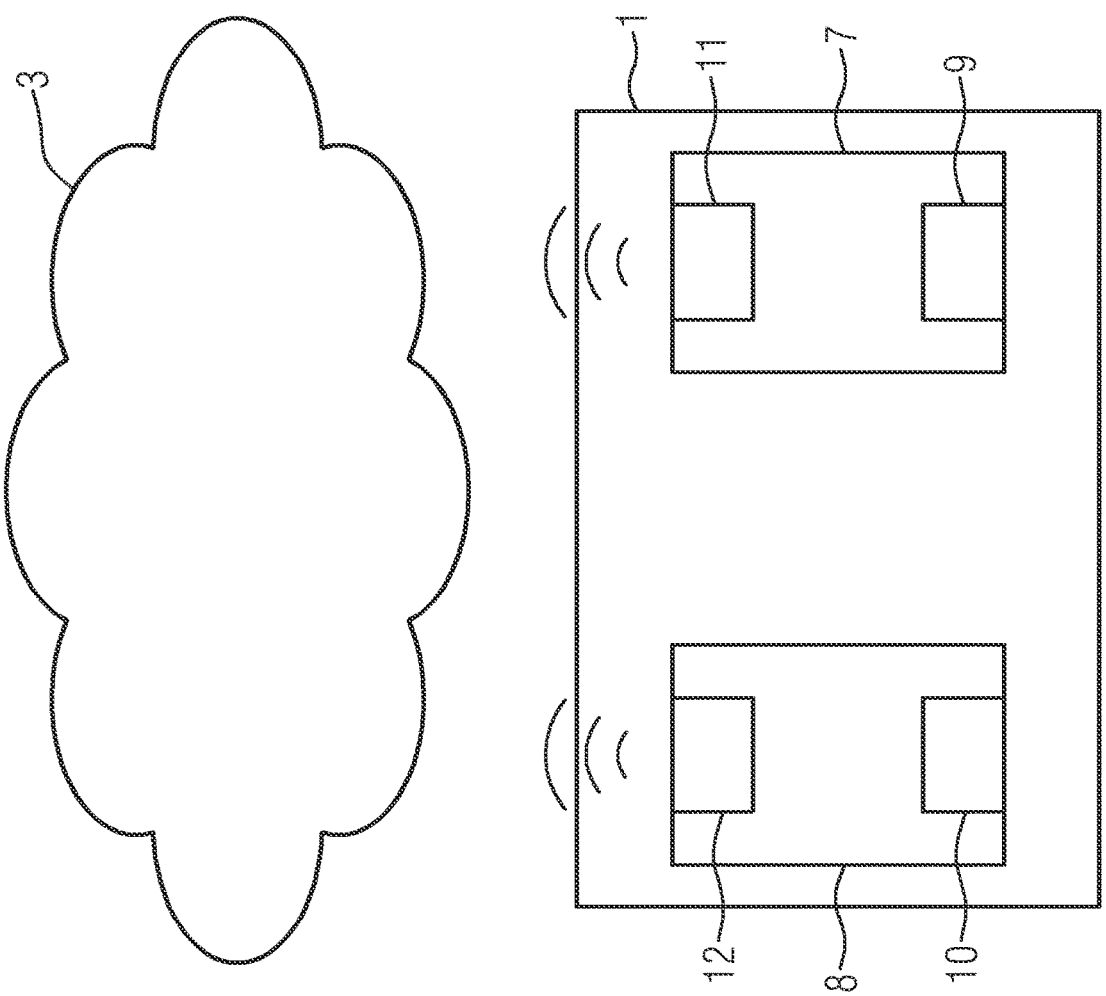
FIG. 1 shows a block diagram of an electrical energy transmission system, of a data cloud and of a mobile terminal, FIG. 2 schematically shows checkboxes of different filter levels, displayed by a graphical user interface.

FIG. 1 (FIG. 1) shows a block diagram of an electrical energy transmission system 1, of a data cloud 3 and of a terminal 5.

The electrical energy transmission system 1 comprises a multiplicity of system components 7, 8, each of which has a sensor unit 9, 10 that is configured to acquire measured data regarding at least one operating parameter of the system component 7, 8 and a communication interface 11, 12 that is configured to transmit the measured data and component information regarding the system component 7, 8 to the data cloud 3. FIG. 1 shows only two system components 7, 8 by way of example.

A system component 7, 8 is for example a transformer, a feedthrough, a measuring transducer (current or voltage converter), a coil, a power switch, a surge arrester or a circuit breaker, for example in switchgear.

The sensor unit 9, 10 of a system component 7, 8 acquires, as measured data, for example a temperature of the system component 7, 8, a pressure in the system component 7, 8, a current strength of an electric current flowing in the system component 7, 8 and/or a voltage present at or in the system component 7, 8.

An identifier (for example data representing a sequence of numbers, letters and/or special characters) assigned to a system component 7, 8 and/or a type of the system component 7, 8 or data representing at least one property of the system component 7, 8 are transmitted to the data cloud 3 by the communication interface 11, 12 of the system component 7, 8 as component information regarding the system component 7, 8, for example. The communication interface 11, 12 of a system component 7, 8 is for example configured to transmit the measured data from the sensor unit 9, 10 of the system component 7, 8 and/or the component information regarding the system component 7, 8 to the data cloud 3 wirelessly (for example using radio waves).

The data cloud 3 is for example implemented on the Internet or an intranet.

The terminal 5 is for example a cell phone (smartphone) or a computer, in particular a portable computer (tablet, notebook, laptop). The mobile terminal 5 is configured to communicate with the data cloud 3, for example wirelessly (for example using radio waves) and to retrieve data from the data cloud 3.

According to the invention, provision is made for a graphical user interface 13 that is configured to visualize information about the electrical energy transmission system 1 that is generated from the measured data and component information transmitted to the data cloud 3. By way of example, the graphical user interface 13 is provided by application software that is executed on the terminal 5.

A user profile is created for a user of the graphical user interface 13 and defines the information that is displayed to the user. By way of example, the graphical user interface 13 has checkboxes 15 for selecting information and the user profile of the user is created on the basis of checkboxes 15 marked by the user. The user profile of the user is stored and, when the graphical user interface 13 is called by the user, the information defined by the user's user profile is displayed to the user. The user profile may be changed by the user, for example by the user changing the marked checkboxes 15.

The graphical user interface 13 has a plurality of filter levels 17 to 20 that build logically on one another and are interlinked and have checkboxes 15, such that marking of a combination of checkboxes 15 of a filter level 17 to 20 determines the checkboxes 15, displayed by the graphical user interface 13, of a filter level 17 to 20 that follows this filter level 17 to 20.

FIG. 2 (FIG. 2) schematically shows one exemplary embodiment of checkboxes 15, displayed by the graphical user interface 13, of different filter levels 17 to 20 of the user interface 13. The arrows in FIG. 2 indicate a logic link between the filter levels 17 to 20.

By way of example, the checkboxes 15 of a first filter level 17 may be used to select a respective group of system components 7, 8. For example, at least one such group comprises system components 7, 8 having an identical function, for example transformers, power switches or circuit breakers. Furthermore, at least one group may for example comprise system components 7, 8 that are arranged at a location of the electrical energy transmission system 1 that is assigned to these system components 7, 8 or in a spatial region of the electrical energy transmission system 1 that is assigned to these system components 7, 8.

The checkboxes 15 of a second filter level 18 may be used for example to select subgroups of groups of system components 7, 8 that are able to be selected using the checkboxes 15 of the first filter level 17.

The checkboxes 15 of a third filter level 19 may be used for example to select individual system components 7, 8.

The checkboxes 15 of a fourth filter level 20 may be used for example to select information regarding system components 7, 8 that is displayed by the graphical user interface 13, for example a temperature of a system component 7, 8, a pressure in a system component 7, 8, a current strength of an electric current flowing in a system component 7, 8 and/or a voltage present at or in a system component 7, 8.

Although the invention has been described and illustrated in more detail through preferred exemplary embodiments, the invention is not restricted by the disclosed examples and other variations may be derived therefrom by a person skilled in the art without departing from the scope of protection of the invention.

The invention claimed is:

1. A method of monitoring an electrical energy transmission system having multiple system components, each system component having a sensor unit configured to acquire measured data regarding at least one operating parameter of the system component and a communication interface configured to transmit the measured data and component information of the multiple system components, the method comprising:

transmitting the measured data and component information regarding the system component of the multiple system components to a data cloud via the communication interfaces of the system components;

providing a graphical user interface configured to visualize information about the electrical energy transmission system, wherein the information about the electrical energy transmission system is generated from the measured data and the component information transmitted to the data cloud;

displaying checkboxes on the graphical user interface for selection of information based on a marking of respective ones of the checkboxes by a user of the graphical user interface;

creating, by a user of the graphical user interface performing the marking of the respective ones of the checkboxes displayed on the graphical user interface, a user profile for the user of the graphical user interface that defines the selection of information that will be displayed to the user, the selection of information being defined by the graphical user interface and including selected portions of the measured data and component information of a respective component from the data cloud; and storing the user profile of the user and, when the graphical user interface is called by the user, displaying the information defined by the user profile to the user;

wherein the user of the graphical user interface can change the user profile for the user of the graphical user interface by changing the marking of the respective ones of the checkboxes displayed on the graphical user interface.

2. The method according to claim 1, which comprises enabling the user profile to be changed by accepting marked checkboxes to be changed by the user.

3. The method according to claim 1, which comprises providing the graphical user interface with a plurality of filter levels that build logically on one another and are interlinked and have checkboxes, and wherein a marking of a combination of checkboxes of a filter level determines the checkboxes, displayed by the graphical user interface, of a filter level that follows the given filter level.

4. The method according to claim 3, which comprises providing checkboxes of a first filter level enabling a selection of a respective group of system components.

5. The method according to claim 4, wherein at least one group of system components comprises system components with an identical function.

6. The method according to claim 4, wherein at least one group of system components comprises given system components that are arranged at a location of the electrical energy transmission system that is assigned to the given system components or in a spatial region of the electrical energy transmission system that is assigned to the given system components.

7. The method according to claim 4, which comprises providing checkboxes of a second filter level enabling a selection of subgroups of the respective group of system components that are selected using the checkboxes of the first filter level.

8. The method according to claim 7, which comprises providing checkboxes of a third filter level enabling a selection of individual system components.

9. The method according to claim 8, which comprises providing checkboxes of a fourth filter level enabling a selection of information regarding system components that is displayed by the graphical user interface.

10. The method according to claim 1, which comprises providing the graphical user interface by application software for terminals.

11. A non-transitory computer-readable medium having a set of computer executable instructions stored thereon, the computer executable instructions causing a computer to perform the method according to claim 1 when executed by the computer.

* * * * *